US005772779A

United States Patent [19]

Rimai et al.

[11] Patent Number: 5,772,779

[45] Date of Patent: Jun. 30, 1998

[54] PHOTOCONDUCTOR CLEANING BRUSH FOR ELIMINATION OF PHOTOCONDUCTOR SCUM

[75] Inventors: Donald Saul Rimai, Webster; Theodore Herbert Morse, Rochester; John Robert Locke, Spencerport; Raymond Charles Bowen, Rochester; James Clinton Maher, North Rose, all of N.Y.

[73] Assignee: Eastman Kodak Company, Rochester, N.Y.

[21] Appl. No.: 697,942

[22] Filed: Sep. 3, 1996

[51] Int. Cl.[6] .............................. B08B 7/00; B08B 3/00; A47L 13/40; C08F 18/20

[52] U.S. Cl. .............................. 134/6; 134/58; 134/102; 134/106; 15/1; 15/1.51; 15/1.52; 15/308; 15/310; 15/340.3; 15/398; 15/21.1; 15/34; 15/38; 15/159.1; 15/256.5; 526/245; 34/58; 252/54

[58] Field of Search .............................. 134/6, 58, 102, 134/106; 430/58; 433/287.2, 288; 526/245; 34/58; 252/54; 15/1, 1.51, 1.52, 308, 310, 340.3, 398, 21.1, 34, 38, 159.1, 256.5

[56] References Cited

U.S. PATENT DOCUMENTS

| | | | |
|---|---|---|---|
| 4,235,642 | 11/1980 | Federighi et al. | 134/58 |
| 4,847,175 | 7/1989 | Pavlisko et al. . | |
| 5,240,802 | 8/1993 | Molaire et al. . | |
| 5,264,531 | 11/1993 | Fukui et al. | 526/245 |
| 5,334,331 | 8/1994 | Fusiak | 252/542 |
| 5,595,687 | 1/1997 | Raynolds et al. | 252/312 |
| 5,630,284 | 5/1997 | Huang | 34/58 |

*Primary Examiner*—W. Gary Jones
*Assistant Examiner*—Dianne Rees
*Attorney, Agent, or Firm*—Doreen M. Wells

[57] ABSTRACT

Photoconductor scumming in an electrophotographic copying machine is substantially eliminated by using a synthetic fiber cleaning brush that is substantially free from low yield strength, low surface energy materials.

13 Claims, No Drawings

PHOTOCONDUCTOR CLEANING BRUSH FOR ELIMINATION OF PHOTOCONDUCTOR SCUM

FIELD OF THE INVENTION

The present invention relates to cleaning brushes for cleaning photoconductor surfaces.

BACKGROUND OF THE INVENTION

In a typical xerographic process, a photoconductive element is initially uniformly charged by such means as a corona or roller charger. The photoconductive element is then image-wise exposed to light, thereby producing an electrostatic latent image. The latent image is then developed into a visible image by passing the photoconductive element over a development station containing electrically charged toner particles. Typically, the toner particles become charged by having them contact so-called carrier particles and tribocharge against the carrier particles. Most typically, the development station consists of a core containing magnets which rotate thereby bringing the developer comprised of a mixture of toning and carrier particles into contact with the electrostatic latent image. The visible image is then transferred to a receiver sheet, most typically paper, by transferring the visible image using any appropriate means such as by application of an appropriate electrostatic field using either an electrically biased roller or a corona. The visible image is then permanently fixed to the receive by suitable means such as fusing.

The formation of scum on photoconductive elements has long been a problem in electrophotography in general and xerography in particular. Scum on the photoconductive element prevents the photoinduced discharge of the photoconductive element, thereby resulting in image artifacts and defects on the final copy. These defects include the appearance of lines which resemble scratches. Scum formation is a particular problem on xerographic photoconductive elements which use newer low abrasion development techniques such as the SP™ system (used in the Ektaprint 2100™ series of copier-duplicators), projection toning, and the like. The carrier in more conventional systems uses a developer having 100 micrometer carrier particles which have the additional function (in addition to being a carrier) of cleaning the surface of the photoconductor by abrasive action. The SP™ system uses much smaller carrier particles, 30 micrometers, which are much less abrasive. Other systems also do not have development systems which tend to clean the photoconductor, such a powder cloud development and projection toning. In any event, there is a continuing need to eliminate the photoconductor scumming problem, particularly in these processes which use relatively gentle development that in turn produce relatively high quality images.

In order to prepare the photoconductive element for subsequent imaging, the photoconductive element must first be cleaned of residual material left after the previous image had been transferred to the receiver. This is most often accomplished using a rotating brush comprised of synthetic fibers such as acrylic, polyester, nylon, dacron or the like. Such fibers are commercially available and are produced for use in a variety of products, unrelated to their use in electrophotography, and their composition is optimized for their production. Synthetic fiber brushes, particularly made of acrylic fibers, have been used in electrophotographic copying machines for decades.

Many approaches have been proposed to remove photoconductor scum. These approaches include using photoconductors coated with agents to reduce the adhesion of the scum to the photoconductor, using abrasive addenda in the developers, wearing away the surface of the photoconductive element, etc. Representative methods of reducing photoconductor scum are described in U.S. Pat. Nos. 4,847,175 and 5,240,802.

SUMMARY OF THE INVENTION

In accordance with the present invention there is provided a cleaning brush for cleaning a photoconductor element, the brush comprised of synthetic fibers which are substantially free from low yield strength, low surface energy materials said fibers being in operative relationship with the photoconductor element so as to allow them to brush the surface of the element.

In another aspect of the invention, there is provided a method for cleaning the surface of a photconductive element comprising the step of brushing the element with a brush comprised of synthetic fibers which are substantially free from low yield strength, low surface energy materials.

In another aspect of the invention there is provided a method of cleaning a synthetic fiber brush for cleaning the surface of a photoconductive element comprising the step of washing said brush so that it is substantially free from low yield strength, low surface energy materials and then positioning the brush in operative relationship with the element.

In our investigation of the photoconductor scumming problem, we found that, in an electrophotographic apparatus utilizing a synthetic fiber (commonly referred to as a "fur brush") cleaning subsystem, scumming of the photoconductive element can be reduced or eliminated by reducing the amount of low yield strength, low surface energy material, which is normally incorporated into the synthetic fibers during the fiber manufacturing process. The reduction in scumming is achieved if the amount of the low yield strength, low surface energy material is reduced to less than 0.2% and, preferably, less than 0.1% by weight of the fibers. Especially good results were obtained when no detectable trace of the material can be detected by normal analytical techniques such as infrared spectroscopy or ESCA.

Fibers labeled as "acrylic" need contain only 85% of material chemically identified as acrylonitrile. The other 15% is usually comprised of other proprietary addenda and is added to the fibers during their production for ease of production, finishing, etc. These addenda are proprietary and, being directly incorporated into the manufacturing process of the synthetic fibers, are inherently present when anyone purchases the fibers from the fiber manufacturers. Moreover, in the absence of any requirement to divulge their presence, in general the customer would not even be aware of their presence. Accordingly, when the customer of the fibers produces a product using the fibers, for example, an acrylic carpet, and specifies that the product is 100% acrylic, it may, in fact, be only 85% acrylonitrile and 15% addenda.

We found that small amounts of low yield strength material having low surface energies (less than 40 ergs/cm$^2$) are added to the chemically pure synthetic fibers to facilitate production at concentrations of the order of 1% by weight. By "low yield strength, low surface energy material" we mean these typical addenda that are added to aid manufacturing and such materials include materials such as waxes, fatty acids, aliphatic hydrocarbons, and esters and salts of fatty acids such as stearic acid, and siloxanes.

We have found that photoconductor scum is due to the presence of clusters of small particles (each particle typically less than 1 $\mu$m diameter) adhering to the phototoconductor. These small particles can originate from a variety of sources including fragments of toning and carrier particles, dust, etc. Most typically the small particles are comprised of calcium carbonate, which is frequently used as a filler material in many papers. The calcium carbonate particles are deposited on the photoconductive element when the paper receiver is brought into contact with the photoconductive element. The photoconductor scum, we have found, is a result of the buildup of these clusters using the low yield strength, low surface energy material from the synthetic fiber brush as a binder. In other words, we have found that the photoconductor scum is typically formed when submicrometer-size particles such as calcium carbonate contact the cleaning roller and form a matrix with the waxes. As recently shown in the scientific literature, materials with low yield strengths and low surface energies tend to flow readily around particles and substrates and coat and adhere to the particles and substrates and cause the particles to adhere to the substrates.

It was not obvious that removing a regular component of the brush fiber would result in a brush that would clean as well as a brush having that component or that the brush would last as long. In fact, extensive testing (over 1,000,000) copies made using a machine having the brush of the present invention shows equivalent longevity and cleaning efficiency.

DETAILED DESCRIPTION

As noted, in particular we have found that the synthetic fiber of the brush should be substantially free from low yield strength, low surface energy material. Preferably the quantity of low yield strength, low surface energy material should be less than 0.2% by weight of the fiber, preferably less than 0.1% by weight. This can be determined by simple extraction and gravimetric analysis. More preferably, the fibers should have no detectable presence of low yield strength, low surface energy material, as detected using standard analytical techniques such as scanning electron microscopy, ESCA (Electron Spectroscopy for Chemical Analysis which is very sensitive to the chemical composition of the surface of the sample being analyzed), or infrared spectroscopy.

The synthetic fibers used in the cleaning brush can comprise various synthetics such as acryolnitriles, dacron, polyester, nylon, or the like. In the event that the fibers, as purchased, have been surface modified with low yield strength, low surface energy material the fibers can be treated by washing in appropriate solvents such as hexane, heptane, dichloromethane, etc., or in aqueous solutions of appropriate degreasers sold under such names as “Goop™”, “Alconox™” (laboratory detergent), “Cascade”™, etc. to remove the low yield strength, low surface energy materials. The solvents should be carefully chosen so as not to dissolve or otherwise attack the fibers or other components of the brush including the materials comprising the core, the blanket to which the fibers are attached, or the glues holding the various components together. In addition to immersing in such solvents it is desirable to scrub the fibers during the washing process. Alternatively, the fibers can be cleansed of the waxes by subjecting the cleaning roller to high pressure steam. Alternatively, special fibers can be produced by the fiber manufacturer without the low yield strength, low surface energy materials. The preferred mode of operation is to immerse the brush into an aqueous solution of a suitable surfactant such as Alconox™ while vigorously scrubbing the brush, subsequently rinsing the brush in pure water to remove all traces of the surfactant and subsequently drying the brush.

In the following examples cleaning brushes were made using a commercially available acrylic fiber produced and sold by Monsanto for a variety of applications. These fibers normally contain at least 0.5% by weight on average of an ester of a fatty acid and are typical of the fibers produced by the fiber industry. These fibers were woven into a mat similar to a pile lining in a coat and then cut and wound around and permanently fixed to a fiber core using glue. Scumming performance was determined by washing part of the brush in the method described in the example, leaving the other part untreated. The tendency to form photoconductor scum was determined by running the brush against a photoconductive element in a Kodak 2100™ copier through which paper was run for the equivalent of between 5,000 and 20,000 copies. The tendency of scum to form was determined directly by observing the photoconductive element.

EXAMPLE 1

Approximately ½ of a cleaning brush was washed in reagent grade hexane using an ultrasonic cleaner. The process was repeated 5 times, using fresh hexane for each wash and analyzing the hexane after each wash. Wax (low yield strength, low surface energy material) was found in decreasing amounts in the first two washes, but none was found after the third. Assuming an exponential decay in the amount of wax present following each wash and knowing that the initial amount of wax was 0.5%, it was estimated that, following the first wash, the amount of wax left on the fibers was 0.2%, 0.07% following the second wash, and approximately 0.01% following the third.

Following the third wash, the brush was evaluated for scum performance using the test described previously. The section of the photoconductor being cleaned with the unwashed portion of the brush showed bad scum formation within 1,000 prints. No visible scum was found in the washed area after 20,000 prints.

EXAMPLE 2

Approximately ½ of a cleaning brush was washed in hexane. This experiment was similar to example 1 except that the brush was washed only once. This corresponds to an estimated average concentration of 0.2% by weight of wax. Twenty thousand prints were made. The portion of the photoconductor cleaned by the unwashed section of the cleaning brush showed bad scum formation. The portion of the photoconductor cleaned by the washed portion of the photoconductor showed no visible scum.

EXAMPLE 3

In this example half of the photoconductor was cleaned by immersing it is a solution of Alconox™ in water. The cleaning vessel had a narrow neck through which the brush had to pass. This generated a scrubbing action during the cleaning process. The brush was then washed with water and dried in air. Five thousand prints were made. The portion of the photoconductor cleaned by the washed portion of the brush showed no scum formation whereas the portion of the photoconductor cleaned by the unwashed portion of the brush showed heavy scum formation.

EXAMPLE 4

In this experiment about half of the cleaning brush was subjected to a steam jet followed by vacuum to remove moisture and air dried. Five thousand prints were made. The portion of the photoconductor cleaned by the unsteamed section of the brush showed uniform scum across the entire section of the film. The portion of the film cleaned by the steamed portion of the brush showed great improvement, with some scum appearing line patterns over only sections of the film. This occurred, presumably, because of the uncontrolled manner in which the steam was applied, but clearly illustrates that the steam was able to remove the wax.

The invention has been described with particular reference to preferred embodiments thereof but it will be understood that variations and modifications can be effected within the spirit and scope of the invention.

We claim:

1. A cleaning brush for cleaning a photoconductor element, the brush comprised of synthetic fibers which are substantially free from low yield strength, low surface energy materials, said fibers being in operative relationship with the photoconductor element so as to allow them to brush the surface of the element.

2. The brush according to claim 1 wherein said low yield strength, low surface energy materials are present in an amount of less than about 0.2% by weight of said fibers.

3. The brush according to claim 1 wherein said low yield strength, low surface energy materials are present in an amount of less than about 0.1% by weight of said fibers.

4. The brush according to claim 1 wherein no detectable trace of said low yield strength, low surface energy materials are present on said fibers.

5. The brush according to claim 1 wherein said fibers are acrylonitrile fibers.

6. A method for cleaning the surface of a photoconductive element comprising the step of brushing the element with a brush comprised of synthetic fibers which are substantially free from low yield strength, low surface energy materials.

7. A method of cleaning a synthetic fiber brush for cleaning the surface of a photoconductive element comprising the steps of washing said brush so that it is substantially free from low yield strength, low surface energy materials and then positioning the brush in operative relationship with the element.

8. The method according to claim 7 wherein said step of washing is carried out in an organic solvent.

9. The method according to claim 7 wherein said step of washing is carried out in an aqueous solution of degreaser.

10. The method according to claim 7 wherein said step of washing is carried out by subjecting the brush to high temperature steam.

11. A cleaning brush comprising synthetic fibers positioned in operative relationship with a photoconductive element, said fibers being substantially free from low yield strength, low surface energy materials.

12. The cleaning brush of claim 11 positioned in the photoconductive element so as to permit it to brush the surface of the element.

13. The brush according to claim 11 wherein said low yield strength, low surface energy materials are present in an amount of about 0.2% by weight of said fibers.

* * * * *